US008684524B2

(12) United States Patent
Archambeau et al.

(10) Patent No.: US 8,684,524 B2
(45) Date of Patent: Apr. 1, 2014

(54) PHOTOCHROMIC OPTICAL ARTICLE COMPRISING A SATURATED PHOTOCHROMIC COATING AND A FILM ABSORBING UV RADIATION

(75) Inventors: Samuel Archambeau, Charenton le Pont (FR); Christian Bovet, Charenton le Pont (FR); Jean-Paul Cano, Charenton le Pont (FR); Anthony Saugey, Charenton le Pont (FR)

(73) Assignee: Essilor International (Compagnie Generale d'Optique) (FR)

( * ) Notice: Subject to any disclaimer, the term of this patent is extended or adjusted under 35 U.S.C. 154(b) by 5 days.

(21) Appl. No.: 13/514,770

(22) PCT Filed: Oct. 7, 2010

(86) PCT No.: PCT/EP2010/064967
§ 371 (c)(1),
(2), (4) Date: Jun. 8, 2012

(87) PCT Pub. No.: WO2011/072900
PCT Pub. Date: Jun. 23, 2011

(65) Prior Publication Data
US 2012/0242954 A1 Sep. 27, 2012

(30) Foreign Application Priority Data
Dec. 17, 2009 (FR) ...................... 09 59102

(51) Int. Cl.
*G02C 7/02* (2006.01)
*F21V 9/06* (2006.01)
*G02B 5/23* (2006.01)

(52) U.S. Cl.
USPC .................. 351/159.62; 351/159.02; 359/361

(58) Field of Classification Search
CPC ....................................... G02C 7/102
USPC ........................... 351/159.61–159.65
See application file for complete search history.

(56) References Cited

U.S. PATENT DOCUMENTS

| 3,406,085 | A | 10/1968 | Brown et al. |
| 7,320,826 | B2 | 1/2008 | Kumar et al. |

(Continued)

FOREIGN PATENT DOCUMENTS

| BE | 663738 A | 11/1965 |
| CN | 1203376 A | 12/1998 |
| FR | 2349149 A1 | 11/1977 |
| GB | 1 520 099 | 8/1978 |
| WO | WO 85/02619 | 6/1985 |
| WO | WO 94/04952 | 3/1994 |

(Continued)

OTHER PUBLICATIONS

PCT International Search Report & Written Opinion received in PCT/EP2010/064967.

*Primary Examiner* — Darryl J Collins
(74) *Attorney, Agent, or Firm* — Vedder Price P.C.; Thomas J. Kowalski; Deborah L. Lu

(57) ABSTRACT

The invention relates to a photochromic optical article with reduced thermal dependency, comprising: (a) a transparent substrate, (b) a saturated photochromic layer having, in the activated state and at a temperature of 20° C. or greater, a relative transmission factor of less than 1% in the visible range, and (c) an anti-UV coating of plastic material at least partially covering the saturated photochromic layer, the said anti-UV coating containing at least one agent which absorbs UV radiation (anti-UV agent) and is distributed in a pattern consisting of a multitude of points, each having a surface area of less than 0.15 mm 2, the average distance between two neighboring points lying between 0.5 and 2 mm and the ratio of the overall surface area of all the points to the total surface area of the anti-UV coating being such that the relative transmission factor of the optical article in the visible range in the activated state and at 20° C. or greater is at least equal to 5%. The invention also relates to two methods for manufacturing such an optical article.

16 Claims, 2 Drawing Sheets

(56) References Cited

U.S. PATENT DOCUMENTS

2005/0243273 A1* 11/2005 Tanikawa et al. ............. 351/163
2007/0139792 A1    6/2007 Sayag

FOREIGN PATENT DOCUMENTS

| WO | WO 99/39167 | 8/1999 |
| WO | WO 2004/020515 A1 | 3/2004 |

* cited by examiner (A) Transmission: 5%

(B) Transmission: 7%

(C) Transmission: 10%

PHOTOCHROMIC OPTICAL ARTICLE COMPRISING A SATURATED PHOTOCHROMIC COATING AND A FILM ABSORBING UV RADIATION

RELATED APPLICATIONS

The present application is filed pursuant to 35 U.S.C. §371 as a U.S. National Phase application of International Patent Application No. PCT/EP2010/064967, which was filed on Oct. 7, 2010, claiming the benefit of priority to French Patent Application No. FR 09 59102 filed on Dec. 17, 2009. The entire content of each of the aforementioned applications is incorporated herein by reference in its entirety.

The present invention relates to a photochromic article, in particular a photochromic ophthalmic lens, having a reduced temperature dependency of the photochromic effect, as well as to several methods for manufacturing such a photochromic article.

All photochromic colorants have, in the active state, an absorbance which depends on the temperature. The higher the temperature is, the lower is the absorbance. This dependency is due to a shift of the conversion equilibrium between the coloured activated state and the generally weakly coloured or uncoloured ground state.

The person skilled in the art is thus constantly confronted either with the problem of insufficient absorbance of a warm photochromic system (for example at 35-40° C.) which has satisfactory absorbance (for example at 15-20° C.) when it is cold, or with the problem of excessive cold coloration when the concentration of the photochromic agent is increased in order to be sufficient when warm.

The approaches aiming to mitigate this very widespread problem generally consist in looking for new photochromic molecules (WO85/02619) or associations of photochromic molecules (see, for example, U.S. Pat. No. 7,320,826). Other teams have looked for polymer matrices capable of making the photochromic colorants less dependent on temperature (see, for example, WO2004/20515 and WO94/04952).

These attempts, however, have to date achieved very moderate success.

In contrast to the various approaches described in the prior art, the present invention does not try to reduce the thermal dependency of photochromic systems by acting at the level of the molecular structure of the colorants or the matrices, but instead proposes a means for freely adjusting the relative transmission factor in the visible range (Tv) of a photochromic film in the cold state which—in the absence of the said means—would be a saturated photochromic system, that is to say essentially opaque, when cold and in the activated state.

This means consists of a plastic film containing a UV radiation-absorbing agent distributed in a particular way in the said film: the anti-UV agent is not in fact present homogeneously in the film, as in a solid solution, but is concentrated on a multitude of miniscule zones, separate from one another, which are invisible or barely visible to the naked eye and which form a pattern extending over a part or all of the said film.

When it is applied on a photochromic layer, this film transmits UV light in the zones free of anti-UV agent but absorbs the light in the zones where the anti-UV agent is present, and thus prevents coloration of the underlying photochromic system.

The present invention consists of the combination of such a film with a saturated photochromic layer, that is to say with a photochromic layer which, at 20° C. and in the activated state, has a relative transmission factor of less than 1% in the visible range. Such a layer, when it is used on its own as a photochromic layer of ophthalmic lenses, would indeed give a satisfactory warm absorbance (at 35-40° C.) owing to its high concentration of photochromic colorants, but it would be opaque and therefore unusable under colder meteorological conditions.

Figure 1:
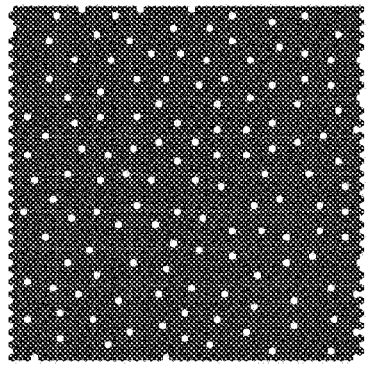
FIGS. 1A, 1B and 1C show a random distribution of the points of an anti-UV agent.
Figure 1:
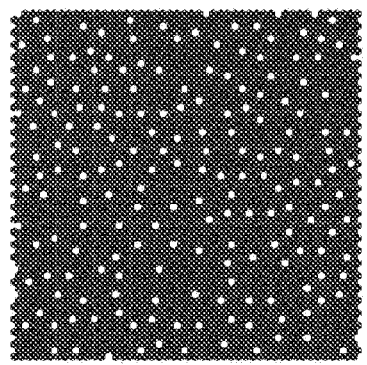
Figure 1:
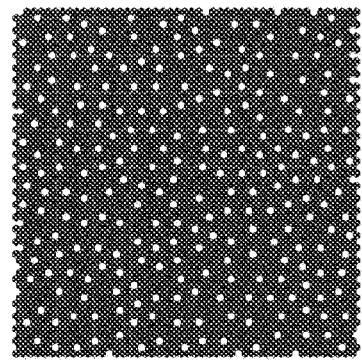

The application of an anti-UV film as described above on a saturated photochromic layer of this type allows the said layer to be made permeable to light, owing to the introduction of uncoloured "holes" containing a non-activated photochromic colorant. It will readily be understood that the transmission of the photochromic layer can easily be adjusted by varying the number and extent of the anti-UV agent zones in the film of plastic material.

The presence of the anti-UV film thus makes it possible to ensure both a minimal relative transmission factor in the visible range for the cold photochromic layer and an acceptable absorbance, that is to say one which is sufficiently high, of the same photochromic layer when warm.

The following table shows by way of example the relative transmission factor in the visible range of an activated photochromic layer whose concentration of photochromic colorant has been selected so that, at 35° C., it gives a relative transmission factor equal to 15% in the visible range. Such a layer is totally opaque at 20° C. (relative transmission factor=0%).

|  | 35° C. | 20° C. |
|---|---|---|
| Without anti-UV film | 15% | 0% |
| With anti-UV film filtering 5% of the radiation | 19.25% | 5% |
| With anti-UV film filtering 10% of the radiation | 23.5% | 10% |

By using an anti-UV film filtering 10% of the light, an entirely acceptable relative transmission factor of 10% in the visible range is thus obtained at 20° C. and at 35° C. a transmission coefficient of only 23.5%.

In the absence of an anti-UV film, a non-saturated photochromic layer having a concentration of photochromic colorant such that its transmission coefficient is 10% at 20° C. would have a transmission coefficient of about 27% at 35° C.

The present invention has the advantage of operating entirely independently of the chemical nature of the photochromic system and of being in principle applicable to any known photochromic colorant or combination of photochromic colorants, present in the form of a thin layer below the anti-UV film.

The present invention consequently relates to a photochromic optical article comprising:

(a) a transparent substrate,
(b) a saturated photochromic layer having, in the activated state and at a temperature of 20° C., a relative transmission factor of less than 1% in the visible range (Tv), and
(c) an anti-UV coating of plastic material at least partially covering the saturated photochromic layer, the said anti-UV coating containing at least one agent which absorbs UV radiation (anti-UV agent) and is distributed in a pattern consisting of a multitude of points, each having a surface area of less than 0.15 mm$^2$, preferably less than 0.1 mm$^2$, the average distance between two neighbouring points lying between 0.5 and 2 mm, preferably between 0.7 and 1.5 mm, and the ratio of the overall surface area of all the points to the total surface area of the anti-UV coating being such that the relative transmission factor of the optical article in the visible range in the activated state and at 20° C. is at least equal to 5%.

The relative transmission factor in the visible range (Tv) is a specific parameter of ophthalmic optics. It summarizes the physiological properties of the filter in a single number: the ratio of the light flux emerging from the glass to the light flux incident on the glass, as they are perceived by the eye, that is to say weighted for each wavelength by the relative spectral luminous efficiency of the eye. This parameter is familiar to the person skilled in the art, who has suitable equipment for measuring it according to standardized methods.

The relative transmission factor of the optical article in the visible range in the activated state and at 20° C. is between 5% and 25%, preferably between 7% and 20%, and particularly preferably between 10% and 15%.

This relative transmission factor of the article in the visible range essentially depends of course on the anti-UV film. Specifically, it is assumed that the substrate carrying the photochromic layer has a relative transmission factor of close to 100% in the visible range and that the photochromic layer has a relative transmission factor in the visible range (at 20° C. and in the activated state) of close to 0% (less than 1%). The relative transmission factor of the optical article in the visible range will be commensurately greater when the number of anti-UV agent zones is higher and when the extent of each of these zones is larger. For "cosmetic" reasons, the zones are preferably small enough to be invisible to the naked eye.

The points which absorb UV radiation may have a random distribution or an ordered distribution. In fact, in order to obtain a uniform appearance overall, it is not necessary for the points of anti-UV agent to be arranged at a constant distance from one another as in FIG. 2. FIGS. 1 (A), (B) and (C) indeed illustrate that a random distribution of the points of anti-UV agent also achieves a uniform relative transmission factor on the macroscopic scale.

In one embodiment of the present invention, the distribution of the points which absorb UV radiation is a regular distribution. Such a regular distribution—whether it is random or ordered—gives the optical article a uniform transmission to the naked eye over the entire extent of the surface of the said optical article.

On the other hand, a differential distribution of the points may also be desirable, in other words a higher density of points at certain positions than at others, for example giving the appearance to the naked eye of a transmission gradient and/or a plurality of separate zones having different transmissions from one another.

The optical article according to the present invention is preferably an ophthalmic lens, in particular an ophthalmic lens made of organic glass.

As indicated in the introduction, the inventive concept of the present invention is in principle applicable to any known photochromic colorant. Merely by way of examples, the following families commonly used in ophthalmic lenses will be mentioned: spiro-oxazines, spiro-indoline[2,3']benzoxazines, chromenes, spiroxazine homo-aza-adamantanes, spirofluorene-(2H)-benzopyrans, naphtho[2,1-b]pyrans and naphtho[1,2-b]pyrans.

The same is true of the chemical nature of the anti-UV agent, which may be selected freely from among those commonly used in the field of optical articles. Examples which may be mentioned for usable UV absorbers are benzotriazoles, triazines such as hydroxyphenyl-S-triazine, benzophenones and oxalic anilides.

The UV absorber is preferably selected from among benzophenones and benzotriazoles. UV absorbers of the benzophenone family are, for example, the products marketed under the following designations: CYASORB® UV 24, CYASORB® UV-1164L, CYASORB® UV-1164 A, CYASORB® UV-2337, CYASORB® UV-531, CYASORB® UV-5411 and CYASORB® UV-9, all available on the market from CYTEC.

Other UV absorbers which may be used in the present invention are UVINUL® 300, UVINUL® 3008, UVINUL® 3040, UVINUL® 3048, UVINUL® 3049 and UVINUL® 3050, available from BASF.

Further examples of UV absorbers are TINUVIN® 1130, TINUVIN® 292, TINUVIN® 5151, TINUVIN® 326, TINUVIN® 384-2, TINUVIN® 3050, TINUVIN® 5055 and TINUVIN® 5060, available from CIBA.

Further examples of UV absorbers are SANDUVOR® 3041, SANDUVOR® 3051, SANDUVOR® 3063, SANDUVOR® 3070 and SANDUVOR® 3225 available from CLARIANT.

Similarly, the chemical natures of the matrix of the photochromic layer and that of the anti-UV film are not crucial, and in principle it is possible to use any transparent polymer material exhibiting suitable adhesion and mechanical resistance. The matrix of the photochromic layer may be a material prepared by a sol-gel method, an organic polymer, a liquid, a gel, etc. The matrix of the anti-UV film may, for example, be a matrix based on poly(ethylene terephthalate), copolymers of norbornene and ethylene (COC, Cyclic Olefin Polymers), cellulose acetobutyrate (CAB) or triacetyl cellulose (TAC).

The thicknesses of the various layers of the optical article of the present invention are comparable with those of equivalent layers described in the prior art. Thus, the photochromic layer conventionally has a thickness of between 1 and 500 μm, in particular between 5 and 50 μm. The film of plastic material, containing at least one anti-UV agent, typically has a thickness of between 50 and 150 micrometers, preferably between 75 and 125 micrometers.

The present invention also relates to two methods for manufacturing a photochromic article as described above.

A first method comprises the following steps:
(i) depositing a photochromic layer, saturated at 20° C., on a transparent substrate,
(ii) manufacturing a film of plastic material containing at least one anti-UV agent distributed in a pattern consisting of a multitude of points, each having a surface area of less than 0.15 mm$^2$, preferably less than 0.1 mm$^2$, the average distance between two neighbouring points lying between 0.5 and 2 mm, preferably between 0.7 and 1.5 mm, and the ratio of the overall surface area of all the points to the total surface area of the anti-UV coating being such that the relative transmission factor of the optical article in the visible range in the activated state and at 20° C. is at least equal to 5%,
(iii) applying the film of plastic material thus obtained onto the photochromic layer.

Of course, steps (i) and (ii) are carried out independently of one another and step (ii) may consequently precede step (i), or alternatively the two steps may be carried out in parallel and simultaneously.

Step (ii) of manufacturing the film of plastic material containing the anti-UV agent is an important step of the method. This is because it involves introducing a determined quantity of anti-UV agent according to a particular distribution at separate positions of the said film. Such introduction presupposes good control of the deposition of a multitude of very small quantities of anti-UV agent. At all costs, it is necessary to prevent the various points of anti-UV agent from being in contact with one another in the film of plastic material.

In a preferred embodiment of the method of the invention, a transfer sheet will be used which receives the anti-UV agent and subsequently transmits it to the film of plastic material during a heat treatment step.

Step (ii) of the method of manufacturing the film of plastic material will consequently preferably comprise bringing a transfer sheet containing at least one anti-UV agent in contact with the film of plastic material, and heating the assembly to a sufficient temperature in order to transfer the anti-UV agent from the transfer sheet to the film of plastic material.

In a first embodiment, the transfer sheet is impregnated uniformly with the anti-UV agent, for example by immersion in a solution of the said anti-UV agent. In this case, the pattern consisting of a multitude of points is formed by virtue of a mask, comprising a multitude of perforations, interposed during the heating step between the transfer sheet and the film of plastic material. The transfer sheet then comes into contact with the film of plastic material only at the perforations, and the diffusion of the anti-UV agent into the film of plastic material is limited by the number and size of these perforations.

In a second embodiment of the method according to the invention, the pattern consisting of a multitude of points is formed not by using a mask but by printing on the transfer sheet with an ink containing the anti-UV agent, before the said transfer sheet is brought in contact with the film of plastic material. The transfer sheet is therefore not impregnated uniformly with the anti-UV agent; rather, the pattern of points is already formed on the transfer sheet and transferred as such onto the film of plastic material by contact and heating.

Lastly, in a third embodiment of the manufacturing method, which is particularly preferred, the transfer sheet is first formed on the surface of the film of plastic material, then is printed on with an ink containing the anti-UV agent in a pattern consisting of a multitude of points, before being subjected to heating, thus allowing the anti-UV agent to be transferred to the film of plastic material. The main steps of this method are as follows:

Step (a): depositing an alcoholic solution of poly(vinyl butyral) on a transparent support film of plastic material, preferably poly(ethylene terephthalate) (PET), Step (b): evaporating the solvent of the alcoholic solution of poly(vinyl butyral) so as to form a layer of poly(vinyl butyral) on the transparent support film, Step (c): printing on the layer of poly(vinyl butyral) with an ink containing a compound which absorbs ultraviolet radiation (UV absorber), in a pattern, Step (d): heating the support film of plastic material, coated with the printed layer of poly(vinyl butyral), to a temperature and for a time which are sufficient to allow at least some of the UV absorber to pass from the layer of poly(vinyl butyral) to the support film of plastic material, Step (e): removing the layer of poly(vinyl butyral), preferably by washing with a suitable solvent.

In the various embodiments of the first method according to the invention, the introduction of the anti-UV agent precedes the application of the film of plastic material on the photochromic layer. It is, however, also feasible to fix the film of plastic material onto the photochromic layer first, and only then to introduce the anti-UV agent therein.

The invention consequently furthermore relates to a method for manufacturing a photochromic optical article as described above, characterized in that it comprises the following steps:

(i) depositing a photochromic layer, saturated at 20° C., on a transparent substrate, (ii) applying a film of plastic material on the photochromic layer, (iii) introducing into the film of plastic material at least one anti-UV agent in a pattern consisting of a multitude of points, each having a surface area of less than $0.15$ mm$^2$, preferably less than $0.1$ mm$^2$, the average distance between two neighbouring points lying between 0.5 and 2 mm, preferably between 0.7 and 1.5 mm, and the ratio of the overall surface area of all the points to the total surface area of the anti-UV coating being such that the relative transmission factor of the optical article in the visible range in the activated state and at 20° C. is at least equal to 5%.

Step (iii) preferably comprises bringing a transfer sheet containing at least one agent which absorbs UV radiation (anti-UV agent) in contact with the film of plastic material, and heating the assembly to a sufficient temperature in order to transfer the anti-UV agent from the transfer sheet to the film of plastic material.

The three embodiments described above for the first method according to the invention also apply mutatis mutandis to the second manufacturing method.

Thus, according to the first embodiment, the transfer sheet may be impregnated uniformly with the anti-UV agent, the pattern consisting of a multitude of points being formed by virtue of a mask, comprising a multitude of perforations, interposed during the heating step between the transfer sheet and the film of plastic material.

Figure 3:
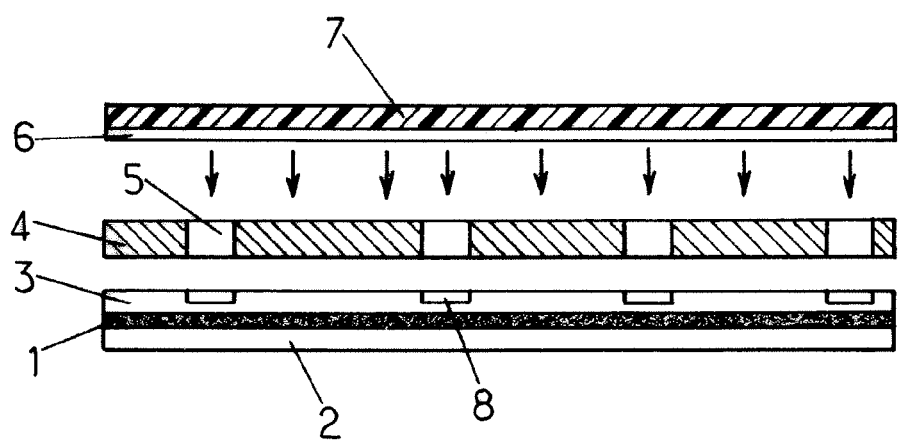
FIG. 3 is a schematic showing an embodiment of the photochromic optical article of the invention.

This embodiment is illustrated in FIG. 3. In this figure, the saturated photochromic layer 1 lies on a transparent support 2 and is covered over its entire surface with a transparent film of plastic material 3. A mask 4 comprising perforations 5 is brought in contact with the film of plastic material, and the transfer sheet 6 impregnated with anti-UV agent, optionally fixed on a suitable support 7, is brought in contact with the mask. When the assembly is heated under pressure, the anti-UV agent will diffuse from the transfer sheet 6 into the film of plastic material 3 only via the perforations 5, in order to form small zones 8 absorbing UV radiation therein.

Figure 2:
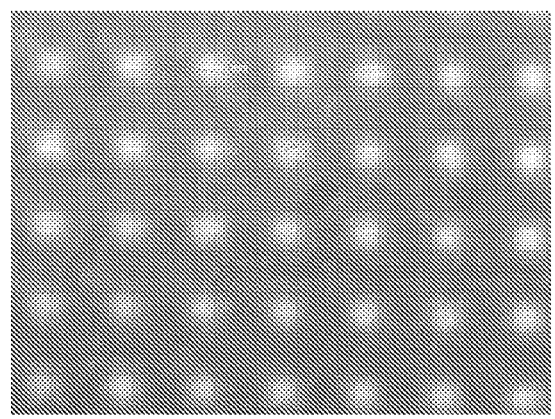
FIG. 2 shows an embodiment of the invention viewed using a microscope.

FIG. 2 shows an optical article obtained in this way (consisting of a transparent support, a photochromic layer and a film of plastic material) viewed using a microscope and illuminated through the rear. This image exhibits a multitude of transparent zones, well separated from one another, which correspond to the zones 8 of FIG. 3 containing the anti-UV agent. The latter prevents coloration of the underlying photochromic layer and thus ensures minimal transmission of the optical article.

According to the second embodiment, applied to the second method, the pattern consisting of a multitude of points is formed by printing on the transfer sheet with an ink containing the anti-UV agent, before the transfer sheet and the film of plastic material are brought in contact.

Lastly, according to the third embodiment applied to the second method, the transfer sheet is first formed on the surface of the film of plastic material, then is subsequently printed on with an ink containing the anti-UV agent in a pattern consisting of a multitude of points.

The choice of the material of the transfer sheet is important. When the anti-UV agent is deposited by printing, the transfer sheet must be capable of rapidly and individually absorbing the droplets of ink deposited, for example, by an ink jet. It must furthermore have a low enough affinity for the UV absorber in order to be able to transfer it to the plastic film during the heat treatment. After having fulfilled its function as a receiver and then donor of the anti-UV agent, the absorbent layer must furthermore be easy to remove from the plastic film, for example by peeling or washing with solvents which are inert with respect to the plastic film. Examples which may be mentioned for polymers suitable for forming the transfer sheet are poly(vinyl butyral) or poly(vinyl alcohol). In all the embodiments described, the transfer of the anti-UV agent from the transfer sheet to the film of plastic material is carried out by heating, preferably under pressure, to a temperature higher than the glass transition temperature of the film of plastic material, preferably lying between 120° C. and 170° C., and in particular between 140 and 160° C. The duration of the heating step is preferably between 3 and 45 minutes, in particular between 5 and 30 minutes.

The invention claimed is:

1. Photochromic optical article comprising:
    (a) a transparent substrate,
    (b) a saturated photochromic layer having, in the activated state and at a temperature of 20° C., a relative transmission factor of less than 1% in the visible range (Tv), and
    (c) an anti-UV coating of plastic material at least partially covering the saturated photochromic layer, the said anti-UV coating containing at least one agent which absorbs UV radiation (anti-UV agent) and is distributed in a pattern consisting of a multitude of points, each having a surface area of less than 0.15 mm$^2$, the average distance between two neighbouring points lying between 0.5 and 2 mm, and the ratio of the overall surface area of all the points to the total surface area of the anti-UV coating being such that the relative transmission factor of the optical article in the visible range in the activated state and at 20° C. or more, is at least equal to 5%.

2. Photochromic optical article according to claim 1, characterized in that the relative transmission factor of the optical article in the visible range in the activated state and at 20° C. or more, is between 5% and 25%.

3. Photochromic optical article according to claim 1, characterized in that the points which absorb UV radiation have a random distribution or an ordered distribution.

4. Photochromic optical article according to claim 1, characterized in that the distribution of the points which absorb UV radiation is a regular distribution giving the optical article a uniform transmission to the naked eye.

5. Photochromic optical article according to claim 1, characterized in that the distribution of the points which absorb UV radiation is denser at certain positions than at others, giving the appearance to the naked eye of a transmission gradient and/or a plurality of separate zones having different transmissions.

6. Photochromic optical article according to claim 1, characterized in that it is an ophthalmic lens.

7. Method for manufacturing a photochromic article according to claim 1, characterized in that it comprises the following steps:
    depositing a photochromic layer, saturated at 20° C. or more, on a transparent substrate,
    manufacturing a film of plastic material containing at least one anti-UV agent distributed in a pattern consisting of a multitude of points, each having a surface area of less than 0.15 mm$^2$ the average distance between two neighbouring points lying between 0.5 and 2 mm and the ratio of the overall surface area of all the points to the total surface area of the anti-UV coating being such that the relative transmission factor of the optical article in the visible range in the activated state and at 20° C. or more, is at least equal to 5%, and
    applying the film of plastic material thus obtained on the photochromic layer.

8. Method according to claim 7, characterized in that step of manufacturing the film of plastic material comprises:
    bringing a transfer sheet containing at least one anti-UV agent in contact with the film of plastic material, and
    heating the assembly to a sufficient temperature in order to obtain transfer of the anti-UV agent from the transfer sheet to the film of plastic material.

9. Method according to claim 8, characterized in that the transfer sheet is impregnated uniformly with the anti-UV agent, and in that the pattern consisting of a multitude of points is formed by virtue of a mask, comprising a multitude of perforations, interposed during the heating step between the transfer sheet and the film of plastic material.

10. Method according to claim 8, characterized in that the pattern consisting of a multitude of points is formed by printing on the transfer sheet with an ink containing the anti-UV agent, before the transfer sheet and the film of plastic material are brought in contact.

11. Method according to claim 8, characterized in that the transfer sheet is first formed on the surface of the film of plastic material, then is printed on with an ink containing the anti-UV agent in a pattern consisting of a multitude of points.

12. Method for manufacturing a photochromic optical article according to claim 1, characterized in that it comprises the following steps:
    depositing a photochromic layer, saturated at 20° C., on a transparent substrate,
    applying a film of plastic material on the photochromic layer,
    introducing into the film of plastic material at least one anti-UV agent in a pattern consisting of a multitude of points, each having a surface area of less than 0.15 mm$^2$ the average distance between two neighbouring points lying between 0.5 and 2 mm and the ratio of the overall surface area of all the points to the total surface area of the anti-UV coating being such that the relative transmission factor of the optical article in the visible range in the activated state and at 20° C. or more, is at least equal to 5%.

13. Method according to claim 12, characterized in that the applying the film step comprises:
    bringing a transfer sheet containing at least one agent which absorbs UV radiation (anti-UV) in contact with the film of plastic material, and
    heating the assembly to a sufficient temperature in order to obtain transfer of the anti-UV agent from the transfer sheet to the film of plastic material.

14. Method according to claim 13, characterized in that the transfer sheet is impregnated uniformly with the anti-UV agent, and in that the pattern consisting of a multitude of points is formed by virtue of a mask, comprising a multitude of perforations, interposed during the heating step between the transfer sheet and the film of plastic material.

15. Method according to claim 13, characterized in that the pattern consisting of a multitude of points is formed by printing on the transfer sheet with an ink containing the anti-UV agent, before the transfer sheet and the film of plastic material are brought in contact.

16. Method according to claim 13, characterized in that the transfer sheet is first formed on the surface of the film of plastic material, then is subsequently printed on with an ink containing the anti-UV agent in a pattern consisting of a multitude of points.

* * * * *